Patented Nov. 2, 1937

2,097,860

UNITED STATES PATENT OFFICE 2,097,860

ANTHRAQUINONE THIOPHENE AND SELENOPHENE CARBOXYLIC ACID COMPOUNDS

Ralph N. Lulek, Waukesha, and Clarence F. Belcher, South Milwaukee, Wis., assignors to E. I. du Pont de Nemours & Company, Wilmington, Del., a corporation of Delaware No Drawing. Application September 30, 1936, Serial No. 103,348

6 Claims. (Cl. 260—53)

This invention relates to the preparation of new anthraquinone thiophene and selenophene carboxylic acid compounds of the general formula

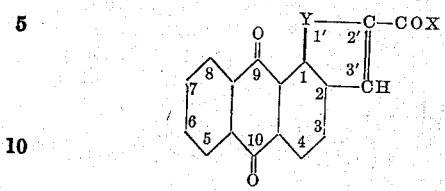

wherein Y stands for sulfur or selenium and X stands for OH or a halogen atom.

The object of the invention is to provide new acid chlorides of the anthraquinone series which are useful as dyestuff intermediates and which, among other uses, may be condensed with aminoanthraquinone compounds to produce new vat dyestuffs of good fastness properties.

It is a further object of the invention to provide a process for preparing anthraquinone-2,1-thiophene-(or selenophene) 2'-carboxylic acid compounds, thereby making available new acids and acid chlorides of the anthraquinone thiophene and selenophene series for dyestuff manufacture, and for use wherever sulfur or selenium containing anthraquinone compounds of the thiophene and selenophene series are desired.

According to our invention anthraquinone-2,1-thiophene-(or selenophene) 2'-carboxylic acid may be prepared by reacting a 1-chloroanthraquinone-2-acrylic acid (obtained by the process described in German Patent 282,265) with an alkali-metal polysulfide or selenide under atmospheric pressure or in an autoclave, to produce the corresponding alkali-metal salt of the acid. The alkali-metal salt may then be converted to the free acid or acid halide by the usual methods employed for preparing free acids and their acid halides.

The following examples are given to more fully illustrate the preferred methods for preparing these acids and acid halides. The parts used are by weight.

Example 1

10 parts of 1-chloroanthraquinone-2-acrylic acid (obtained according to German Patent 282,265, by heating 1-chloroanthraquinone-2-aldehyde with sodium acetate in acetic anhydride) are dissolved in 50 parts of water with addition of sodium hydroxide. To the clear solution are then added 70 parts of sodium sulfide solution (18–20%) and 6 parts of sulfur, and the mass is boiled for several hours. After cooling, the sodium salt of the new anthraquinone-2,1-thiophene-2'-carboxylic acid is filtered off, washed with 20% salt solution and purified by redissolving in water and filtering.

The acid is precipitated by acidification of the filtrate. It may be further purified by recrystallization from trichlorobenzene. The product has the following probable formula

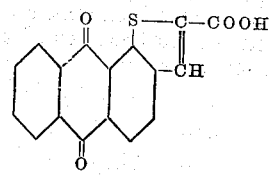

Example 2

10 parts of anthraquinone-2,1-thiophene-2'-carboxylic acid are suspended in 100 parts of trichlorobenzene and 20 parts of thionyl chloride added. The mixture is heated to 70–80° for one hour under agitation and then cooled. The anthraquinone-2,1-thiophene-2'-carboxylic acid chloride is filtered off, washed with trichlorobenzene and alcohol and dried. It is a yellow-brown crystalline powder and dissolves in sulfuric acid with a brownish color.

Example 3

18 parts of powdered selenium are slurried in 200 cc. alcohol in a vessel equipped with a reflux condenser. Under good agitation 16 parts of metallic sodium are added gradually at 50 to 70° C. When all the sodium has reacted 18 parts more of selenium powder are added to the sodium selenide solution so formed and refluxed for one-half hour. The selenide solution is diluted with 100 cc. of water and 25 parts of 1-chloro-2-anthraquinoneacrylic acid are added and agitated at the reflux temperature for four hours (microscopic examination shows fine yellow needles). The mass is cooled, filtered and washed alkali-free with 10% salt solution. The crude anthraquinone - 2,1 - selenophene - 2' - carboxylic acid sodium salt is dissolved in hot water, the solution filtered hot. (The residue may be extracted a second time if necessary.) The cooled filtrate is acidified with dilute hydrochloric acid. The precipitate is collected, washed and dried.

Example 4

10 parts of anthraquinone-2,1-selenophene-2'-carboxylic acid are suspended in 100 parts of ortho-dichlorobenzene. 9 parts of phosphorous pentachloride are added and the whole is stirred and warmed at 90–100° C. for one hour. It is then cooled, filtered, and washed with dichlorobenzene, alcohol, and ether, and dried. The anthraquinone-2,1-selenophene-2'-carboxylic acid chloride is a yellow crystalline powder. It dissolves in concentrated sulfuric acid with a yellowish brown color.

The anthraquinone-2,1-thiophene- and selenophene-2'-carboxylic acids may be converted by any of the usual methods to the acid halides, such as by treatment with phosphorous pentachloride in various organic solvents, or thionyl bromide, phosphorous pentabromide, etc.

This application is a continuation-in-part of copending application Serial No. 27,814 filed June 21, 1935.

We claim:

1. An anthraquinone carboxylic acid compound of the general formula

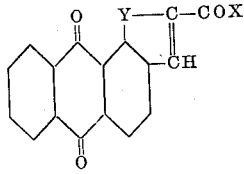

wherein Y stands for an element of the class consisting of sulfur and selenium, and X stands for a substituent of the class consisting of OH and a halogen atom.

2. Anthraquinone-2,1(S)-thiophene-2'-carboxylic acid chloride.

3. Anthraquinone-2,1(Se)-selenophene-2'-carboxylic acid chloride.

4. In the process for preparing compounds of the class consisting of anthraquinone-2,1(S)-thiophene-2'-carboxylic acid and anthraquinone-2,1(Se)-selenophene-2'-carboxylic acid, the step which comprises heating to reaction temperature a 1-chloroanthraquinone-2-acrylic acid in alkaline solution with a compound of the class consisting of alkali-metal polysulfides and selenides.

5. The process for the preparation of compounds of the class consisting of anthraquinone-2,1(S)-thiophene-2'-carboxylic acid chloride and anthraquinone-2,1(Se)-selenophene-2'-carboxylic acid chloride which comprises heating to reaction temperature a 1-chloroanthraquinone-2-acrylic acid in alkaline solution with a compound of the class consisting of alkali-metal polysulfides and selenides, and reacting the resulting carboxylic acid with an acid chloride forming agent.

6. In the process for preparing anthraquinone-2,1(Se)-selenophene-2'-carboxylic acid, the step which comprises heating to reaction temperature a 1-chloroanthraquinone-2-acrylic acid in alkaline solution with alkali-metal polyselenide.

RALPH N. LULEK.
CLARENCE F. BELCHER.